Patented May 3, 1938

2,116,227

UNITED STATES PATENT OFFICE 2,116,227

METHOD OF PRODUCING FROM WASTE SULPHITE LYE A THICKLY LIQUID WATER SOLUTION OF AN ADHESIVE SUBSTANCE

Karl Börje Winlöf, Stockholm, Sweden

No Drawing. Application February 3, 1937, Serial No. 123,864. In Sweden February 1, 1936

4 Claims. (Cl. 134—23.91)

The present invention relates to a method of producing from waste sulphite lye a thickly liquid water solution of an adhesive substance, which is particularly apt to be used as an adhesive for paper or pasteboard work.

The preferred initial material is the waste lye formed when digesting so-called strong pulp, which has a total $SO_2$-content of 3.5-4% and a content of free $SO_2$ amounting to 2.3-2.5%. In this method of digestion, in which a weaker digestion liquor is used, one obtains in the waste lye quantities both of dissolved calcium salts and of free and bound sulphurous acid, which, when calculated in percentage, are smaller than in waste lyes from other methods of digestion. In the waste lye from the digestion of strong pulp the binding and adhering constituents of the wood (lignin and resins) exist in their most precious form possible, i. e. they are not in too high a degree subjected to the deleterious chemical action of the acid calcium sulphite, this in comparison with waste lyes from other methods of digestion.

The waste lye obtained directly from the digester and having a temperature of about 65° C. is first caused to pass through a filter for the purpose of separating impurities of solid particles. The filtered lye then passes direct into a vacuum concentrating apparatus or evaporator made of acid proof material. The use of acid proof material in the vacuum apparatus is an expedient, because the influence on the waste lye of a material, which is not acid-proof, always produces deleterious deposits and discolourations of the lye. During the filtering and the introducing into the digester care should be taken to avoid exposure of the lye, in a mentionable degree, to the deleterious influence of daylight or atmospheric air. The influence of daylight or sunlight on the unconcentrated and untreated waste lye is directly deleterious, because, among other things, the waste lye contains the trivalent phenol phloroglucine, and lignin, which on the waste lye, when the latter has been exposed to daylight in an unconcentrated and untreated state, have a discolouring action. The influence of the atmospheric air is deleterious, too, because oxidation may easily occur and produce harmful deposits and discolourations.

The filtered waste lye in the digester, which in general has a specific gravity varying between 1.05-1.06, is now concentrated under high vacuum ranging from 20 to 40 mm. mercury column, and at a temperature of about 62° C. The temperature in the digester must not exceed 70° C., because otherwise the final product will be hard and brittle and inapt to its purpose as an adhesive substance. At temperatures exceeding 70° C. also incrusting substances are easily formed, which deposit on the bottom and sides of the digester and thus reduce the efficiency. Nor must the temperature lie below 60° C., because the final product will then be oily in its consistency and in a high degree lose its adhesive properties.

This can perhaps be explained thereby that if the highest concentration temperature does not reach 60° C., some constituents remain in the lye, which are deleterious to the quality of the final product and impart to the same an oily consistency.

The most suitable temperature for the concentration is 62° C. One concentrates at this temperature under high vacuum to a consistency, at which the mass has a specific gravity of between 1.3-1.4. When the above mentioned consistency has been obtained a volume of water is added in the digester, which corresponds to the volume of the contents. The temperature of the added volume of water shall be equal to the temperature of digestion, i. e. about 62° C. After that one again concentrates to a specific gravity of the lye of 1.3-1.4. This is done 2 or 3 times according to the content of free sulphurous acid of the lye. The addition of water has for its purpose to reduce the content of sulphurous acid in the lye to a minimum, which is obtained by repeatedly added quantities of water and following concentrating operations. When the lye has been liberated from sulphurous acid the lye will bind a certain quantity of water probably in the form of molecular water, which, when the finished product is used as an adhesive and gluing substance, appears in such a manner that the finished product does not set completely but remains somewhat elastic and therefore has a more stable adhesive capacity. By treatment with chemicals, which expel the sulphurous acid, the lye cannot be liberated from free sulphurous acid without the lye being thereby chemically influenced, which causes discolourations and deposits. By using water as an indirectly expelling means this deleterious action of chemicals is avoided, so that to this point the lye maintains the same chemical composition as the initial lye except for free sulphurous acid and other constituents, which are easily volatile between 60-70° C. To the waste lye, which has been concentrated and treated to this point and which consists substantially of dry mass and water, a slight quantity of sulphuric acid equal to from .05 per cent to .06 per cent by weight (as to weight of concentrated waste sulphite lye) is now added direct in the digester, while the temperature is kept equal to the concentration temperature, about 62° C. The addition of sulphuric acid is not a necessary step as the product resulting from the steps hereinbefore described prior to its addition is a suitable one for use as an adhesive, although susceptible of further improvement as herein pointed out. The object of adding sulphuric acid is to somewhat improve the colour of the product and bind sulphurous acid, which may remain, and not to precipitate the calcium salt. Therefore, attention is paid to the addition of sulphuric acid not being so great that the solubility product of the calcium salt is exceeded and so that no precipitation takes place. To the substance treated with sulphuric acid small quantities of potash alum not in excess of 0.1 per cent by weight of the final quantity, or possibly aluminium sub-acetate not exceeding .15 per cent by weight and 1–2% methyl alcohol 1 to 2 per cent by weight of the final quantity are added. These added ingredients, while not essential to a satisfactory adhesive, have the action that the obtained final product gets a more elastic consistency and when used requires a somewhat shorter time for drying.

A thickly liquid adhesive and gluing substance has now been obtained, the consistency of which is elastic and uniform, the colour of which is light yellow, and the adhesive properties of which are very good. Also after having been stored for a long time this substance keeps its light colour and its good adhesive properties.

Having now described my invention, what I claim as new and desire to secure by Letters Patent is:

1. A method of producing from waste sulphite lye, a thickly liquid water solution of an adhesive substance, consisting in concentrating under high vacuum, the waste lye coming directly from the digester in a hot state, liberated from solid particles and protected from the influence of daylight and the atmospheric air, at a temperature of about 60–70° C., to a consistency corresponding substantially to the specific gravity of 1.4, then adding, repeated times, a volume of water corresponding to the volume of the material concentrated to the said consistency, and repeating just as many times the concentrating of the contents of the evaporator to a final specific gravity of about 1.4, adding to the product sulphuric acid in such a limited quantity that the precipitation of calcium salts is avoided.

2. The method of producing an adhesive substance of a thickly liquid water solution form as claimed in claim 1, in which the adhesive substance is also treated by adding potash alum and also methyl alcohol.

3. The method of producing an adhesive substance in the form of a thickly liquid water solution which consists in filtering the waste lye coming directly from the digester; passing the same directly into a vacuum concentrating apparatus and simultaneously preventing exposure of the waste lye to atmospheric air or daylight; concentrating said waste lye under a relatively high vacuum the temperature between 60° and 70° C., adding water to the mass of a volume substantially equal to the volume of the mass, said added water having a temperature substantially the same as the temperature of the mass, and then concentrating the resulting mass to a specific gravity of between 1.3 and 1.4.

4. The method of producing an adhesive substance substantially as defined in claim 3, repeating the addition of water and the concentration of the mass two or more times to reduce the sulphurous acid content of the resultant product; and adding sulphuric acid of a quantity as to avoid precipitation of the calcium salts in the waste sulphite lye while the mass is maintained in the digester at concentration temperature, and thence adding potash alum and a small quantity of methyl alcohol to impart a more elastic consistency to the resulting product.

KARL BÖRJE WINLÖF.